United States Patent [19]
Benson et al.

[11] Patent Number: 6,026,090
[45] Date of Patent: Feb. 15, 2000

[54] METHOD AND SYSTEM FOR RECEIVING ATM CELLS FROM AN ATM NETWORK BY A HOST

[75] Inventors: Michael H. Benson, New Castle; Nhiem Nguyen, Cranberry; Steven J. Schlick, Wexford; George Totolos, Jr., Cranberry, all of Pa.

[73] Assignee: FORE System, Inc., Warrendale, Pa.

[21] Appl. No.: 08/970,636

[22] Filed: Nov. 14, 1997

[51] Int. Cl.[7] .................................................. H04L 12/28
[52] U.S. Cl. .......................... 370/395; 370/399; 370/474
[58] Field of Search .................................... 370/395, 396, 370/397, 398, 393, 412, 474, 419

[56] References Cited

U.S. PATENT DOCUMENTS

| | | | |
|---|---|---|---|
| 5,274,768 | 12/1993 | Traw | 370/397 |
| 5,303,302 | 4/1994 | Burrows | 370/412 |
| 5,379,297 | 1/1995 | Glover | 370/399 |
| 5,483,526 | 1/1996 | Ben-Nun | 370/395 |
| 5,515,363 | 5/1996 | Ben-nun | 370/232 |
| 5,625,625 | 4/1997 | Oskouy | 370/395 |
| 5,633,867 | 5/1997 | Ben-Nun | 370/399 |
| 5,689,509 | 11/1997 | Gaytan | 370/396 |
| 5,734,653 | 3/1998 | Hiraiwa | 370/397 |
| 5,737,314 | 4/1998 | Hatono | 370/235 |
| 5,761,427 | 6/1998 | Shah | 395/200.53 |
| 5,768,275 | 6/1998 | Lincoln | 370/474 |
| 5,796,735 | 8/1998 | Miller | 370/395 |
| 5,848,293 | 12/1998 | Gentry | 395/825 |

*Primary Examiner*—Ajit Patel
*Assistant Examiner*—Ricardo M. Pizarro
*Attorney, Agent, or Firm*—Ansel M. Schwartz

[57] ABSTRACT

An ATM communications system. The system includes an ATM network on which ATM cells of ATM packets travel. The system includes a host having a host memory mechanism preferably having cache lines which stores the cells. The system includes an interface having a receive memory mechanism which stores a partial packet comprising a plurality of cells received from the ATM network. The receive memory mechanism aligns with the host memory mechanism so every transfer from the receive memory mechanism of the plurality of cells to the host memory mechanism fills the host memory mechanism along cache lines of the host memory mechanism. The interface has a bus which connects to the host on which communication between the host and the interface occurs. The interface is connected to the ATM network. A method for sending ATM cells over an ATM network. An interface for a host to receive ATM cells from an ATM communication network.

19 Claims, 16 Drawing Sheets

METHOD AND SYSTEM FOR RECEIVING ATM CELLS FROM AN ATM NETWORK BY A HOST

CROSS-REFERENCE

This application is related to contemporaneously filed U.S. patent application Ser. No. 08/971,170, titled "Method and System for Sending ATM Cells to an ATM Network From a Host", by Michael H. Benson, Nhiem Nguyen, Steven J. Schlick and George Totolos, Jr., incorporated by reference herein; and is related to contemporaneously filed U.S. patent application Ser. No. 08/970,635, titled "Method and System for Using Resource Management Cells in an ATM Network" by Michael H. Benson, Nhiem Nguyen, Steven J. Schlick and George Totolos, Jr., incorporated by reference herein.

FIELD OF THE INVENTION

The present invention is related to the reassembly of ATM packets in a host that are received from an ATM network. More specifically, the present invention is related to the reassembly of ATM packets in a host with an interface that utilizes transfers of partial packets of cells received from an ATM network.

The present invention is related to the segmentation of ATM packets to be sent to an ATM network. More specifically, the present invention is related to the segmentation of ATM packets by transferring a plurality of cells of a packet at a time an interface for subsequent transmission of the cells to the ATM network.

BACKGROUND OF THE INVENTION

An ATM network is primarily made up of switches and endpoints. Switches are used to move 53-byte ATM cells throughout the network, guiding them from one endpoint to another. Each endpoint is responsible for reassembling the ATM cells into packets of information that can be understood by its host machine. Only the 48-byte payload of the ATM cells is needed to form packets. The 5-byte header is generally processed by the network interface card (NIC) and discarded. See FIG. 1.

Historically, the actual reassembly took place on either the NIC or within the host machine itself. In systems where the packet is fully reassembled in host memory, the ATM NIC would write every cell to host memory as it arrived from the network. This has the advantage of requiring small amounts of buffer memory on the NIC. However, it has the disadvantage of overburdening the host interface bus and memory subsystem with small transfers. In systems where the packet is fully reassembled on the NIC, the problem of inefficient use of host resources is solved but the buffer requirements on the NIC become overwhelming. This is especially evident when you consider that the maximum size of an ATM packet is 64 kilobytes. If a NIC wishes to support 4096 active connections or more, the amount of memory required at any one time is unreasonable.

In order to balance the need for host efficiency with the cost and space limitations put on ATM NICs, a method of partial reassembly was developed.

The present invention overcomes the problems associated with large host DMA read latencies when trying to segment ATM packets at high line rates. In addition, it addresses the problems of choosing when to request packet segments and how to manage the card buffers for each connection.

The present invention addresses two conflicting goals in designing an ATM Network Interface card: 1) The requirement to conform to a given Traffic Contract on the ATM Network and 2) The desirability to fetch large blocks of Packet Data from Host Memory, where "large" is greater than the fixed ATM cell payload size of 48 bytes.

Goal #1 comes from a requirement that data cells which are injected by the NIC into the ATM network must conform to one or more parameters. For example, the time interval between cells may be required to meet a specified minimum time. Cells which violate the parameters may be discarded by elements in the ATM network, resulting in loss of data at the receiving ATM NIC.

Goal #2 results from the design of host memory systems. Current host memory systems are most efficient when two goals are achieved. The first goal is to overcome the "first data latency" problem. The problem is that regardless of the size of a read transfer of contiguous bytes from host memory, there is a certain fixed time delay associated with the transfer. For transfers which are relatively short (less than 32 bytes), the first data latency may be comparable or greater than the time to transfer the actual data. This results in a utilization of the host memory bandwidth ED which is less than fifty percent. By increasing the transfer of data, the first data latency is amortized over a longer data transfer interval. The burst size after which the first data latency is no longer significant is referred to as the optimal burst size (OBS).

The second issue for host memory systems is memory system cache line size and alignment. A host memory system has an ideal minimum size and alignment (IMSA) for data transfer which is a power-of-two in bytes. A typical value of IMSA is 32 bytes, but can range up to 64 or 128 bytes or greater. Not only is there a performance penalty if at least IMSA bytes are not fetched, but the beginning of the transfer must be aligned to an address which is equal to "IMSA*n", where "n" is an integer.

The first conflict arises due to the traffic contract and optimal burst size. If the OBS is greater than a cell payload (48 bytes), then it is most efficient for the ATM NIC to transfer more the one cell from Host Memory at a time. However, the traffic contract for the connection may prevent the NIC from sending the cells sequentially on the ATM network. The second conflict arises when the ideal minimum size and alignment is 32 bytes or greater. Since an ATM cell payload is only 48 bytes, at least half of all cell payload transfers from host memory will not be properly aligned for maximum efficiency.

Previous implementations of ATM NIC have used one of two approaches. The first approach is to transfer a single cell payload at a time from Host Memory. This approach allows the ATM NIC to meet the traffic contract, but it results in lower host memory efficiency. A second approach is for the NIC to transfer entire data packets from host memory to a memory on the NIC and then transmit cells from the memory. While this approach results in good host memory bandwidth utilization, it also requires a very large memory on the ATM NIC a nd increases the latency of transmission.

The solution which the present invention proposes is to transfer data from host memory in units which are smaller than an entire data packet but greater than the OBS and IMSA for the host memory system. The unit of data transferred is referred to as a "Local Buffer". The NIC then transmits cells from these local buffers to the ATM network at a rate which does not violate the traffic contract. Compared to a solution which buffers entire data packets on the NIC before transmission, the invention requires less memory and results in lower latency to the ATM network.

This is the first known architecture to define card segmentation buffers that are larger than an ATM cell. The architecture proved essential to the card's success, especially when interfacing with machines with large read latencies.

SUMMARY OF THE INVENTION

The present invention pertains to an ATM communications system The system comprises an ATM network on which ATM cells of ATM packets travel. The system comprises a host having a host memory mechanism preferably having cache lines which stores the cells. The system comprises an interface having a receive memory mechanism which stores a partial packet comprising a plurality of cells received from the ATM network. The receive memory mechanism aligns with the host memory mechanism so every transfer from the receive memory mechanism of the plurality of cells to the host memory mechanism fills the host memory mechanism preferably along cache lines of the host memory mechanism. The interface has a bus which connects to the host on which communication between the host and the interface occurs. The interface is connected to the ATM network.

The present invention pertains to a method for sending ATM cells over an ATM network. The method comprises the steps of receiving a partial packet comprising a plurality of ATM cells having at least a payload of a connection at an interface from an ATM network. Then there is the step of storing at least the payload of the plurality of cells in the interface. Next there is the step of sending a receive transfer signal from the interface to a host to transfer the plurality of cells from the interface to the host. Then there is the step of transferring the plurality of cells in conjunction with each transfer signal to the interface.

The present invention pertains to an interface for a host to receive ATM cells from an ATM communications network. The interface comprises an ATM network on which ATM cells of ATM packets travel. The interface comprises a host having a host memory mechanism preferably having cache lines which stores the cells. The interface comprises a receive memory mechanism which stores a partial packet comprising a plurality of cells received from the ATM network. The receive memory mechanism is adapted to align with the host memory mechanism so every transfer from the receive memory mechanism of the plurality of cells to the host memory mechanism fills the host memory mechanism preferably along cache lines of the host memory mechanism. The interface comprises a bus which is adapted to connect to the host on which communication between the host and the interface occurs. The interface comprises a receive mechanism connected to the ATM network to receive ATM cells from the ATM network. The interface comprises a receive controller which places the ATM cells received from the ATM network into the receive memory mechanism.

BRIEF DESCRIPTION OF THE DRAWINGS

In the accompanying drawings, the preferred embodiment of the invention and preferred methods of practicing the invention are illustrated in which.

DETAILED DESCRIPTION

Figure 2:
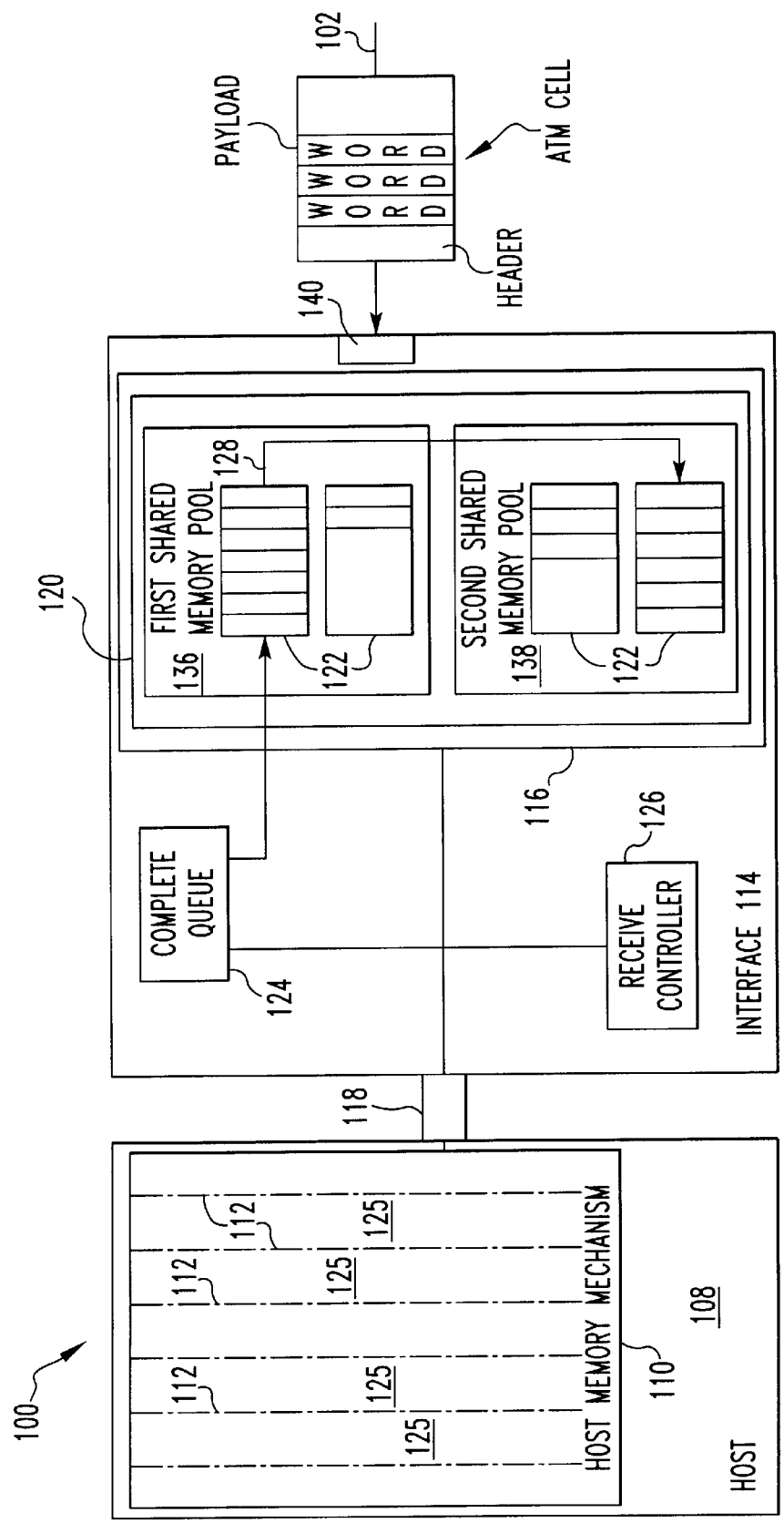
FIG. 2 is a schematic representation of a system for reassembling ATM cells from an ATM network.

Referring now to the drawings wherein like reference numerals refer to similar or identical parts throughout the several views, and more specifically to FIG. 2 thereof, there is shown an ATM communications system 100 The system 100 comprises an ATM network 102 on which ATM packets having ATM cells that include payloads travel. The system 100 comprises a host 108 having a host memory mechanism 110 which stores at least the payloads of the cells. The system 100 comprises an interface 114 having a receive memory mechanism 116 which stores a partial packet comprising a plurality of at least payloads of cells received from the ATM network 102. The receive memory mechanism 116 aligns with the host memory mechanism 110. The interface 114 has a bus 118 which connects to the host 108 on which communication between the host 108 and the interface 114 occurs. The interface 114 is connected to the ATM network 102. The interface 114 is preferably a NIC 114.

Preferably, the memory mechanism 110 has cache lines 112. The receive memory mechanism 116 aligns with the host memory mechanism 110 so every transfer from the receive memory mechanism 116 of the plurality of cells to the host memory mechanism 110 fills the host memory mechanism 110 along cache lines 112 of the host memory mechanism 110.

Preferably, the receive memory mechanism 116 includes a receive shared memory pool mechanism 120 in which receive local buffers 122 are defined to store corresponding pluralities of cells received from the ATM network 102.

Each receive local buffer 122 preferably stores a predetermined number of cells received from the ATM network 102. The receive local buffers 122 are preferably receive card buffers 122.

Preferably, the interface 114 includes a complete queue 124 to which a receive local buffer 122 is joined when the receive local buffer 122 is to transfer the plurality of cells stored in it to the host 108. A receive local buffer 122 joined to the complete queue 124 preferably has a complete pointer 128 to a next receive local buffer 122 in the complete queue 124. Preferably, after a receive local buffer 122 transfers the plurality of cells into the host 108, the memory associated with the receive local buffer is returned to the receive shared memory pool mechanism 120.

Preferably, the host memory mechanism 110 is formed of host buffers 125 having a size defined by cache lines 112, and the receive local buffers 122 have a size which is equal to or less than the size of the host buffers 125. In some instances, the size of the receive local buffer 122 can be independent of the host buffer 125 size. For example, the receive local buffers can be larger than the size of the host buffers. Each cell is preferably comprised of words and the size of each host buffer 125 holds a predetermined number of words, and the size of each receive local buffer 122 holds less than or equal to the predetermined number of words. A word preferably comprises four bytes.

The interface 114 preferably includes a receive controller 126 which joins a receive local buffer 122 to the complete queue 124 when the receive local buffer 122 is to transfer the plurality of cells stored in it to the host 108. Preferably, the receive controller 126 counts the words of cells received by the interface 114 from the ATM network 102 and places no more than the predetermined number of words from the cells received by the interface 114 into the corresponding receive local buffer 122.

The receive controller 126 preferably places any remaining words of a cell that has had words placed into a receive local buffer 122 to fill the receive local buffer 122 into another receive local buffer 122. Preferably, the receive controller 126 joins a receive local buffer 122 to the complete queue 124 when the receive local buffer 122 is filled with the predetermined number of words, the receive local buffer 122 is filled with at least a last word of an end of packet cell, the connection from which the pluralities of cells came from terminated, or the receive local buffer 122 is filled with enough words to completely fill a host buffer 125. Each ATM cell received from the ATM network 102 preferably has a header and a payload and the receive controller 126 removes the header of a cell the interface 114 receives and places the cell into a receive local buffer 122 corresponding to the header of a cell. The receive controller 126 is preferably a segmentation and reassembly engine 126.

Preferably, the receive shared memory pool mechanism 120 includes a first receive shared memory pool 136 and a second receive shared memory pool 138. Each receive shared memory pool has receive local buffers 122. The receive controller 126 alternately creates receive local buffers 122 for pluralities of cells received by the interface 114 that they store for a corresponding connection between the first and second shared memory pools as a receive local buffer 122 is joined to the complete queue 124. The presence of two or more pools allows for the advantage of multiple banks typically built into memory devices.

Figure 1:
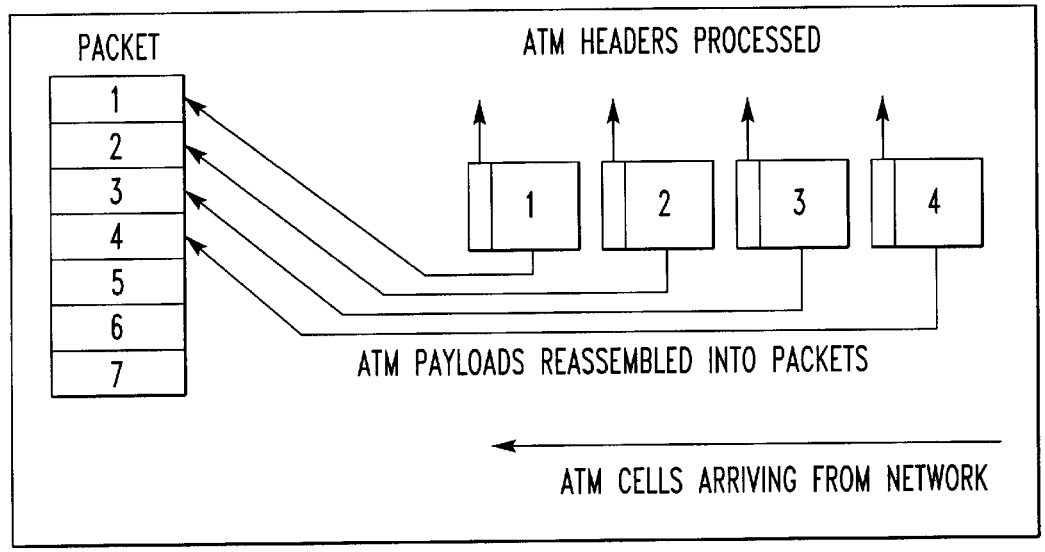
FIG. 1 is a schematic representation of reassembly of ATM cells into packets.
Figure 3:
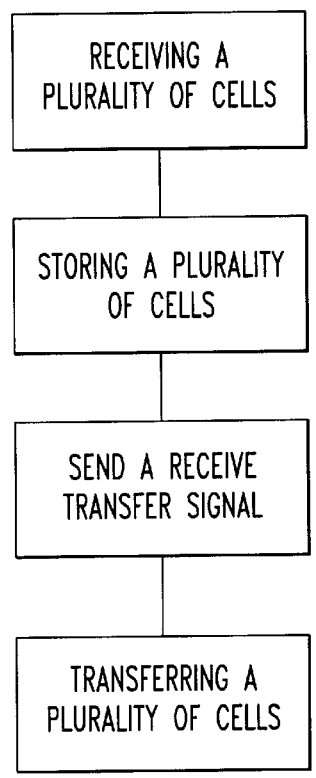
FIG. 3 is a flow chart of a method for reassembling ATM cells from an ATM network.

The present invention pertains to a method for sending ATM cells over an ATM network 102, as shown in FIG. 3. The method comprises the steps of receiving a partial packet comprising a plurality of ATM cells having at least a payload of a connection at an interface 114 from an ATM network 102. Then there is the step of storing at least the payload of the plurality of cells in the interface 114. Next there is the step of sending a receive transfer signal from the interface 114 to a host 108 to transfer the plurality of cells from the interface 114 to the host 108. Then there is the step of transferring the plurality of cells in conjunction with each transfer signal to the interface 114.

Preferably, the storing step includes the step of storing the plurality of cells in a receive memory mechanism 116 of the interface 114 which is aligned with a host memory mechanism 110 of the host 108 so every transfer from the receive memory mechanism 116 of the plurality of cells to the host 108 memory mechanism fills the host 108 memory mechanism along cache lines 112 of the host 108 memory mechanism.

The present invention pertains to an interface 114 for a host 108 to receive ATM cells that include packets from an ATM communications network 102. The interface 114 comprises an ATM network 102 on which ATM cells of ATM packets travel. The interface 114 comprises a host 108 having a host memory mechanism 110 having cache lines 112 which stores the cells. The interface 114 comprises a receive memory mechanism 116 which stores a partial packet comprising at least the payloads of a plurality of cells received from the ATM network 102. The receive memory mechanism 116 is adapted to align with the host memory mechanism 110 so every transfer from the receive memory mechanism 116 of the plurality of cells to the host memory mechanism 110 fills the host memory mechanism 110 along cache lines 112 of the host memory mechanism 110. The interface 114 comprises a bus 118 which is adapted to connect to the host 108 on which communication between the host 108 and the interface 114 occurs. The interface 114 comprises a receive mechanism 140 connected to the ATM network 102 to receive ATM cells from the ATM network 102. The interface 114 comprises a receive controller 126 which places the ATM cells received from the ATM network 102 into the receive memory mechanism 116.

Figure 4:
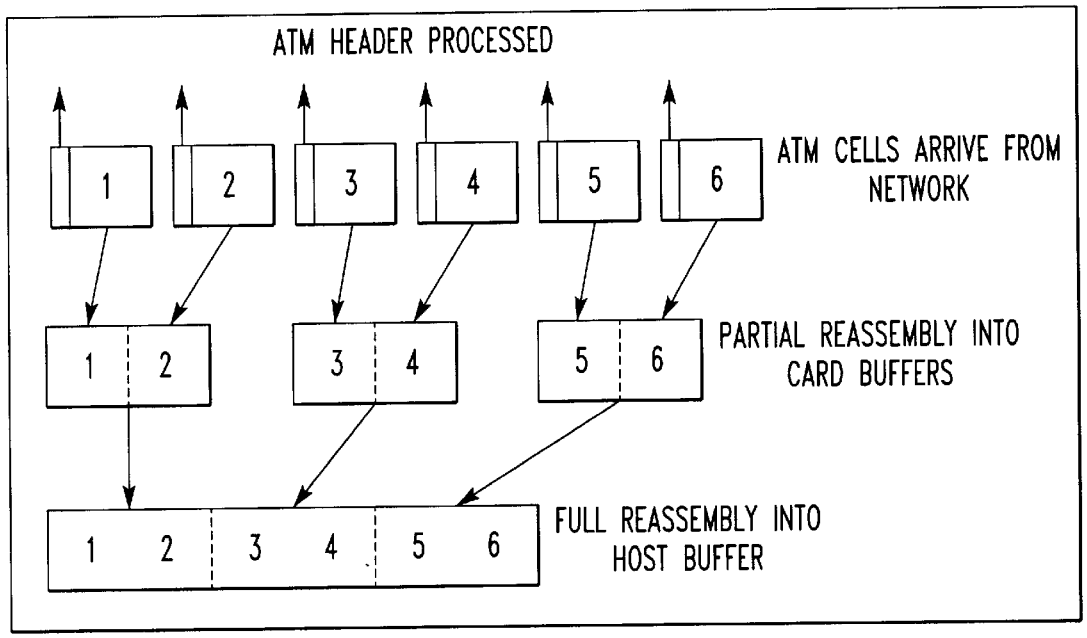
FIG. 4 is a schematic representation of partial reassembly dataflow.

In the operation of the preferred embodiment, as ATM cells arrive from the network 102, the NIC 114 will partially reassemble packets into receive card buffers 122 before fully reassembling them into host buffers 125. Since the arrival of each cell means the manipulation of 48 bytes of data, the most efficient use of card memory would suggest that each card buffer 123 be a multiple of 48 bytes. A diagram showing the flow of data from the network 102 to the host 108 is shown in FIG. 4. It shows an example of partial reassembly using a two-cell card buffer.

The reassembly process shown in FIG. 4 is for a single ATM virtual connection (VC). It is important to note that NICs 114 typically have at least 1024 VCs reassembling simultaneously.

In order for the system 100 to operate, the following should be noted.

The segmentation and reassembly engine (SAR) 126 is responsible for partially reassembling every packet into card memory and fully reassembling the packet into host memory. The SAR 126 is located on the NIC 114 and makes all the decisions on how to process every incoming cell.

There is a shared memory pool of buffers that are located on the NIC 114. These are referred to as receive card buffers 122 and are used to partially reassemble packets as they arrive from the network 102. They are constantly being recycled as they pass between the free queue and complete queue. See FIG. 5 for a picture of the flight of a card buffer 122.

There is a free queue of receive card buffers 122 located in the SAR 126. When the SAR 126 needs a new card buffer 122, it dequeues one from the free pool. At initialization, all card buffers 122 are placed on the free queue.

There is a complete queue of card buffers 122 located on the NIC 114. When the SAR 126 has put the last bit of cell data into the card buffer, it enqueues it to the complete queue 124. There is downstream logic that will use the complete queue 124 to send the partial packets to the host 108 and place the receive card buffer 122 back on the free queue.

There is a pool of free buffers located on the host. These are referred to as host buffers 125 and are used to fully reassemble the ATM packets. The size of these host buffers 125 must be known to the SAR 126.

Under certain circumstances, an ATM cell will need to be placed into two different receive card buffers 122. This procedure is called buffer straddling and occurs when the host buffer 125 is not an exact multiple of 48-bytes in size.

The SAR 126 counts the words in the cells as they arrive. Since the receive card buffers 122 are formed of a size already determined to correspond to the size of the host buffers 125, the SAR 126 only allows enough words to pass to a receive card buffer 122 as would either fill it or fill the corresponding host buffer 125 when the words in the receive card buffer 122 are transferred to it (since the SAR 126 remains knowledgeable about the host buffer 125 status). If all the words in a cell do not fit in the same receive card buffer 122 for these reasons, then any remaining words are placed in the next receive card buffer 122 formed for that connection. To make the operation more efficient, there are two separate receive shared memory pools from which receive card buffers 122 for a connection are ultimately forced. After a receive card buffer 122 becomes ready to be enqueued to the complete queue 124, the next receive card buffer 122 is formed from the other shared memory pool and vice versa.

Figure 5:
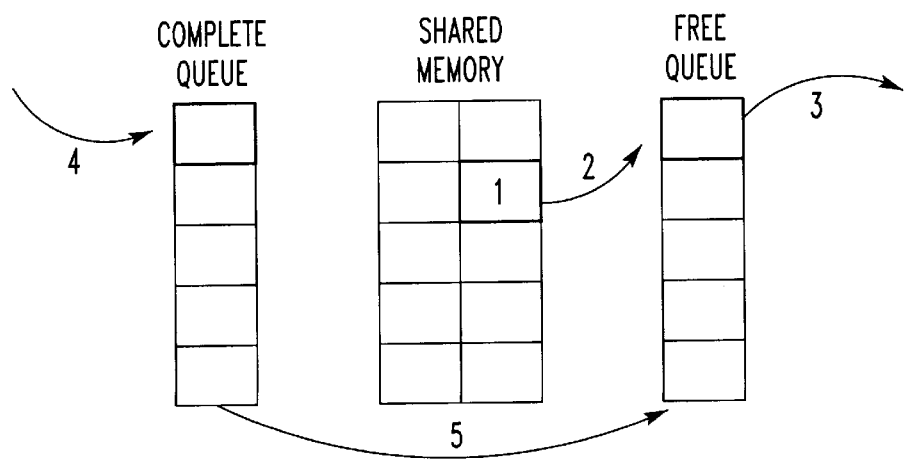
FIG. 5 is a schematic representation of receive card buffer queues.

With reference to FIG. 5,
1. Prior to Initialization, the card buffer is sitting unmapped in shared memory.
2. During initialization, the card buffer is queued to the free queue.
3. When needed, the SAR pops the card buffer from the free queue.
4. When full, the SAR pushes the card buffer onto the complete queue.
5. When its contents are sent to host, the card buffer is moved from the complete to free queue.

During the partial reassembly process, the SAR 126 keeps track of the remaining space in the subject receive card buffer 122 and host buffer 125 for the current connection. It will enqueue a receive card buffer 122 to the complete queue 124 when one of the four following conditions occur:
The receive card buffer 122 fills
The host buffer 125 fills
The last cell of the packet is received
The connection is closed When the receive card buffer 122 is enqueued to the complete queue 124, the SAR 126 causes a queue pointer 128 from the last receive card buffer 122 in the complete queue 124 to point to the receive card buffer 122 now being included to the complete queue 124. This process is repeated as each receive card buffer 122 is enqueued to the complete queue 124. Receive card buffers 122 corresponding to different connections become intermingled in series with each other as they are enqueued into the complete queue 124 so receive card buffers corresponding to the same connection do not necessarily follow consecutively in the complete queue 124. As part of the enqueuing process, a message corresponding to the receive card buffer 122 is processed by the SAR 126 and enqueued on the complete buffer to provide information about where the plurality of cells in the card buffer are to be stored in the host.

The SAR 126 processes each receive card buffer 122 on the complete queue 124 in turn. When a receive card buffer's 122 turn arises for transfer of the plurality of words in it to the host buffer 125, the SAR 126 sends a transfer signal first to the host to inform the host that the transfer is to occur. The host then prepares for the transfer and sends a ready signal back to the SAR 126, as is well known in the art. The SAR 126 then transfers the words in the receive card buffer 122 to the corresponding host buffer 125.

Figure 6:
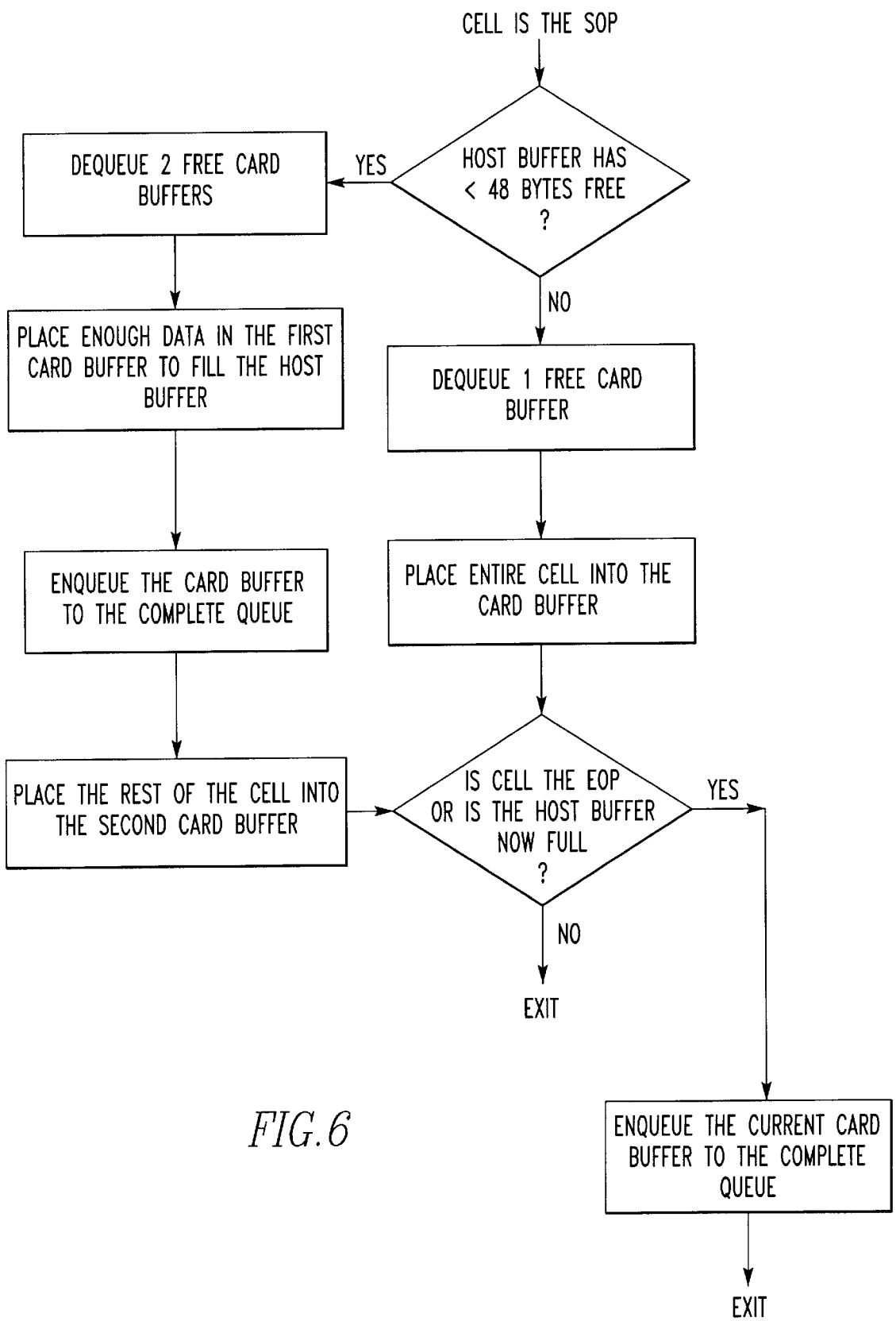
FIG. 6 is a flow chart of partial reassembly decisions for SOP.

When an ATM cell arrives from the network 102, the first determination it must make is whether the cell is the start of packet (SOP), middle of packet (MOP), or end of packet (EOP). Although ATM cells from different connections will arrive asynchronously to each other, ATM cells on the same connection will always come in order to form one packet at a time. The header of an 25 ATM cell only contains an indication of whether or not it is the EOP. Since it is also important to know when a cell is the SOP, the SAR 126 must keep track of the SOP by setting an internal state bit for the connection when the EOP of a previous packet was received. This way, the SAR 126 will know that the next cell must be the start of a new packet. It should also be noted that in the case of single-cell packets, a cell that is the SOP is also the EOP. Since the SAR 126 knows that the receive card buffer 122 is at least 1 cell in size, the only concern when processing SOPs is how big is the host buffer 125. When the arriving cell is the SOP, the SAR 126 will follow a decision process as indicated in the flowchart in FIG. 6.

Figure 7:
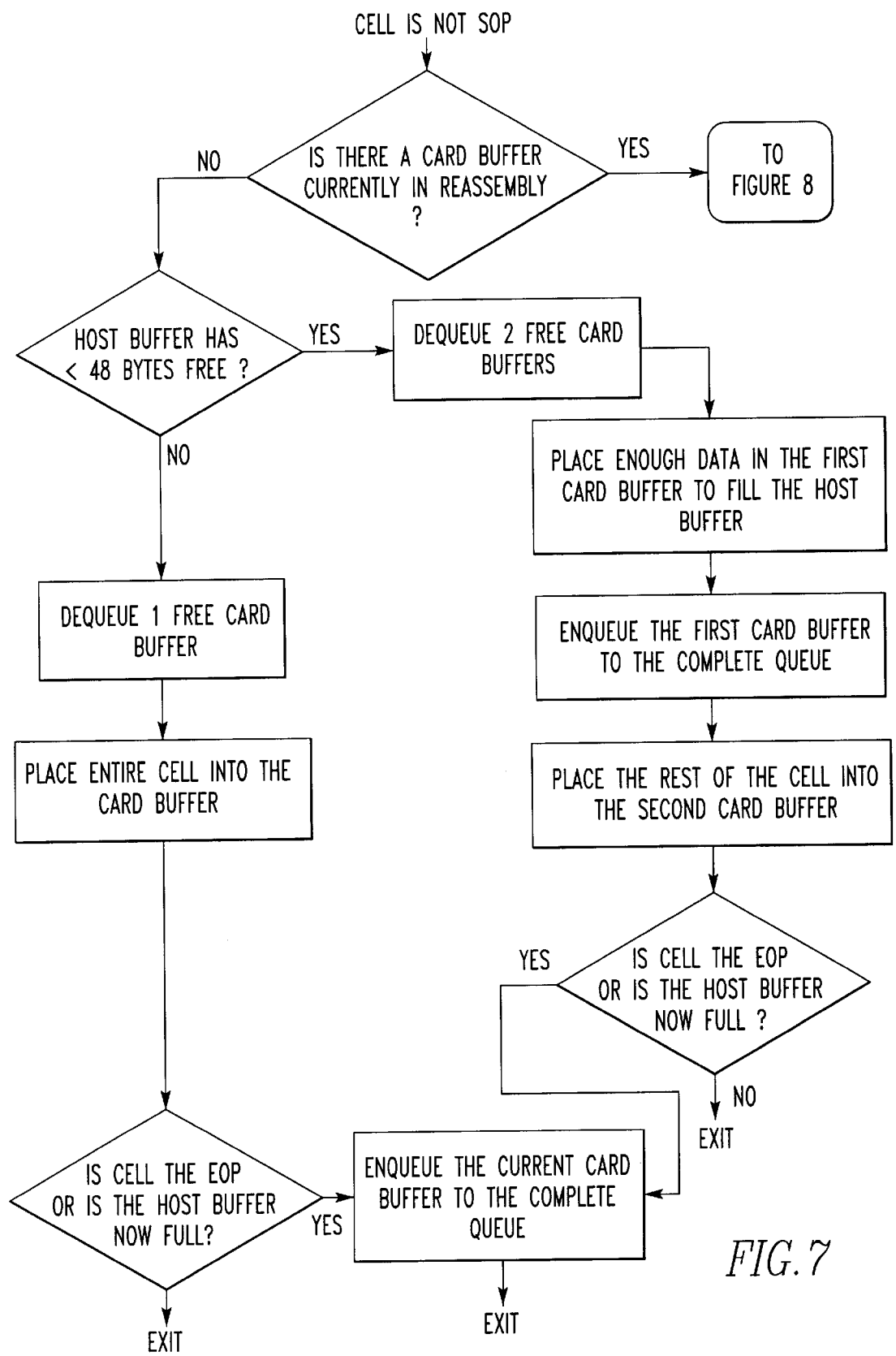
FIG. 7 is a flow chart of non-SOP reassembly without current card buffer.
Figure 8A:
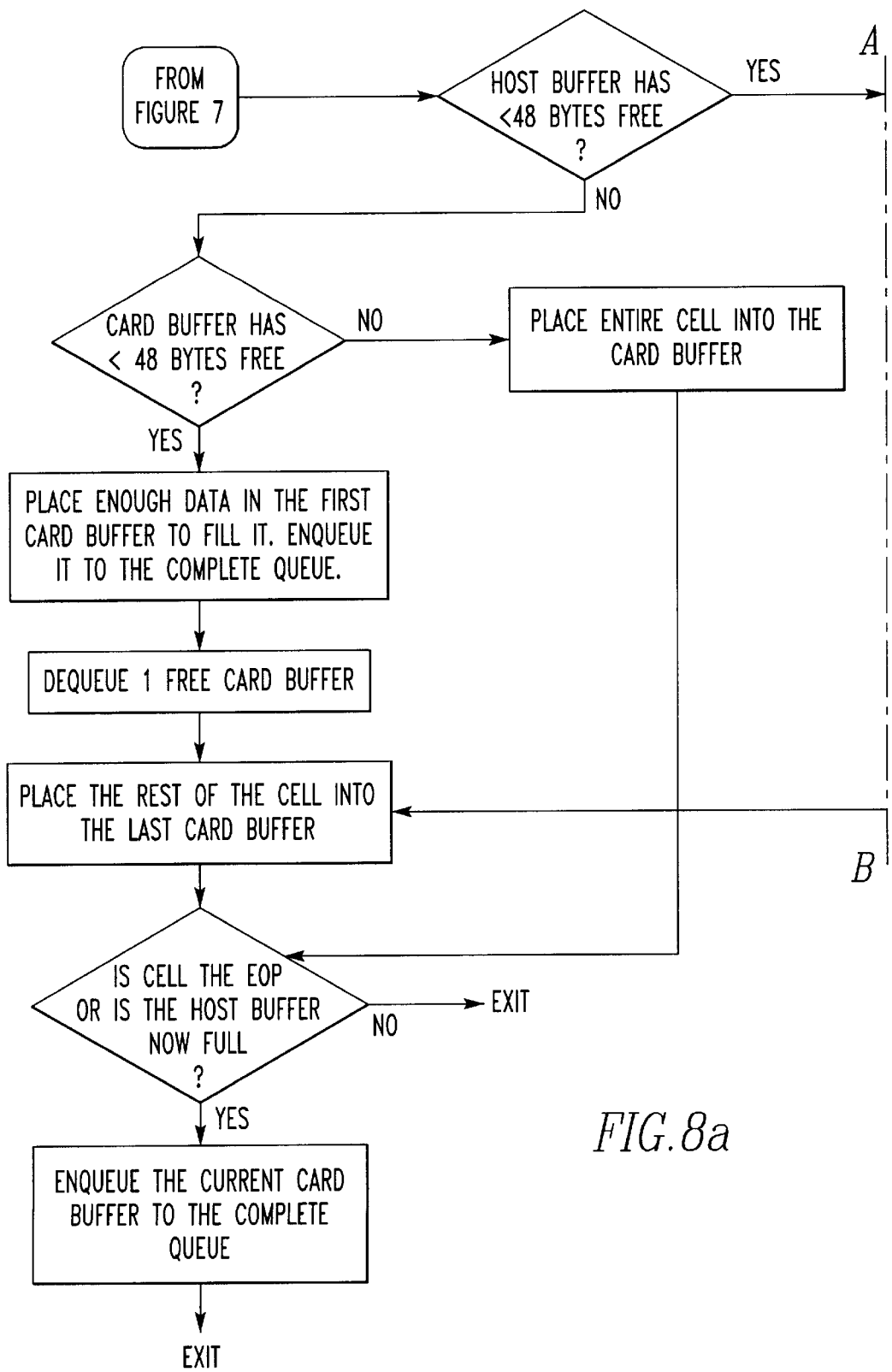
FIG. 8 is a flow chart of non-SOP reassembly with current card buffer.
Figure 8B:
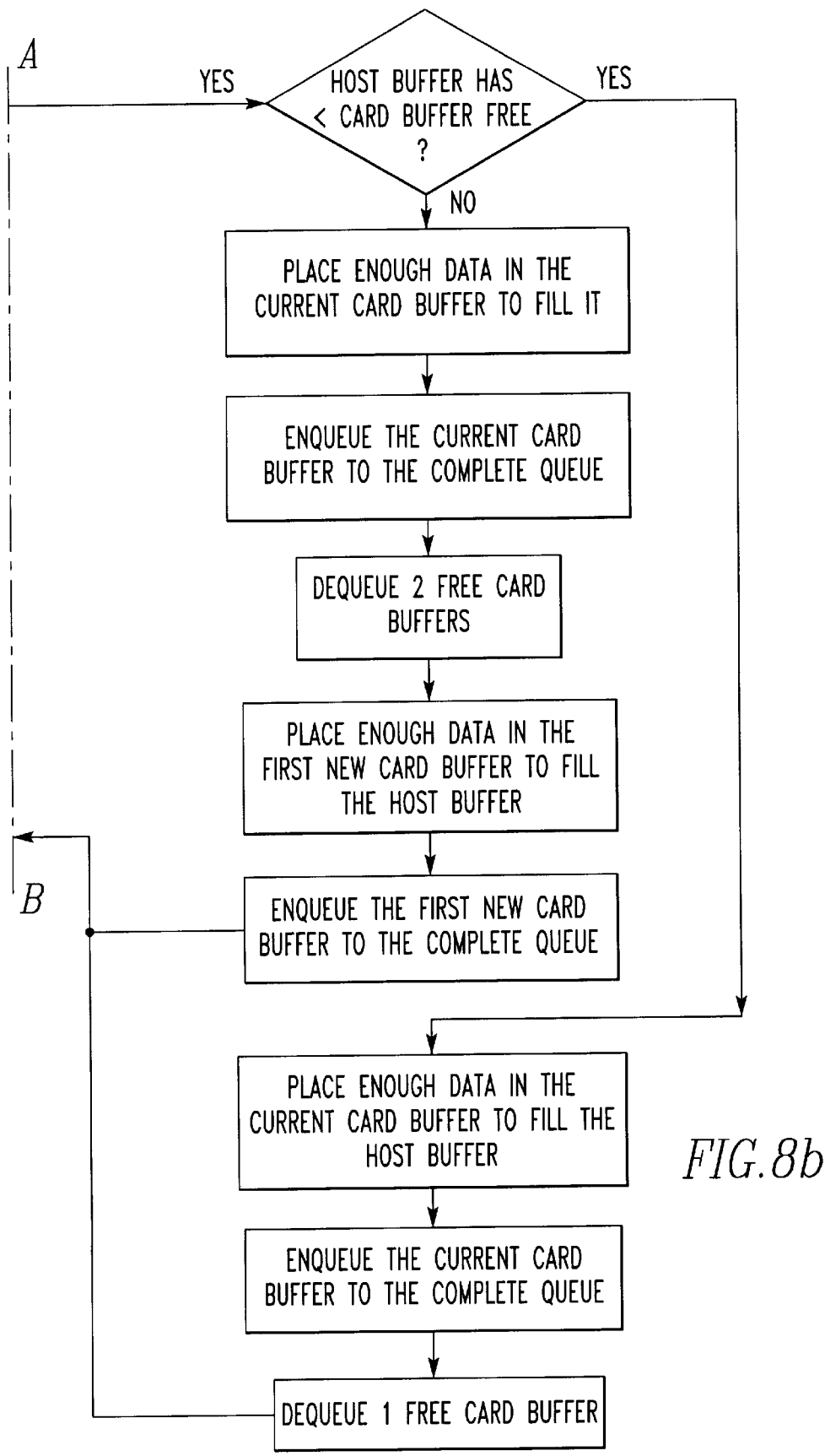

If the cell is not the SOP, the SAR 126 needs to pay closer attention to the size of the receive card buffer 122. The flowchart of how a non-SOP cell is handled is shown in FIG. 7 and FIG. 8.

Using this implementation, there is always only one receive card buffer 122 that is in a state of partial reassembly. So if the receive connection is closed before the end of the current packet has been received on the network 102, it is possible to have a stale receive card buffer 122 taking up space on the NIC 114. Therefore, it is necessary for the SAR 126 to enqueue the partially assembled receive card buffer 122 to the complete queue 124 whenever a connection close command is issued.

Partial reassembly requires less receive card memory per connection than NICs 114 implementing full reassembly. Partial reassembly allows the NIC 114 to increase the size of DMA (direct memory access) writes to host memory. The fixed overhead associated with every DMA can now be spread across a larger transfer resulting in a more efficient use of the bus 118 and improved I/O subsystem performance.

Partial Reassembly allows the NIC 114 to make every memory transfer aligned to the cache line 112 of the host. Transfers to and from main memory that are not cache line 112 aligned are enough to cripple a host's memory subsystem. Typical cache line 112 sizes in today's machines are 32, 64 or 128 bytes. Since the data portion of an ATM cell is 48 bytes, a card buffer that is 8 cells deep will be a multiple of even the largest cache line 112. Because the SAR 126 enqueues receive card buffers 122 when the end of a host buffer 125 is reached, every transfer that the NIC 114 makes to the host 108 will be cache line 112 aligned. The only restriction made to the host 108 is that all host buffers 125 start at a cache line boundary.

Another advantage is the ability to snap off the header of the packet into a separate host buffer 125. When the ATM packet is fully assembled in host memory, it will contain information that is valuable to the driver. In some cases, this packet actually encapsulates another protocol such as TCP which has its own header and payload. Ideally, the driver would like to have the TCP header placed in one buffer and the payload placed in another. This allows the driver to avoid costly memory accesses to move the payload portion of the packet to another buffer for use by an application. It is possible to have the SAR 126 be aware of two buffer pools. The first pool contains a set of buffers called small buffers. These buffers are where the beginning of every packet will be placed. The second pool contains a set of buffers called the large buffers. These buffers are where the rest of the packet will be placed. So for instance, if the driver wants to snap off a 64 byte header from the TCP packet and place the rest of the payload into another buffer, it would make sure that the small buffer size was 64 bytes. It still has the freedom to make the large buffers whatever size it desires. The SAR 126, using partial reassembly, will enqueue its receive card buffer 122 to be sent to the host 108 after the first 64 bytes arrive. It places it in a small buffer for the driver to use. The rest of the packet will be fully reassembled across however many large buffers that are required. Another advantage of the small/large buffer technique is that small packets will end up only being sent to the small buffers, avoiding inefficient use of large buffers.

Figure 9:
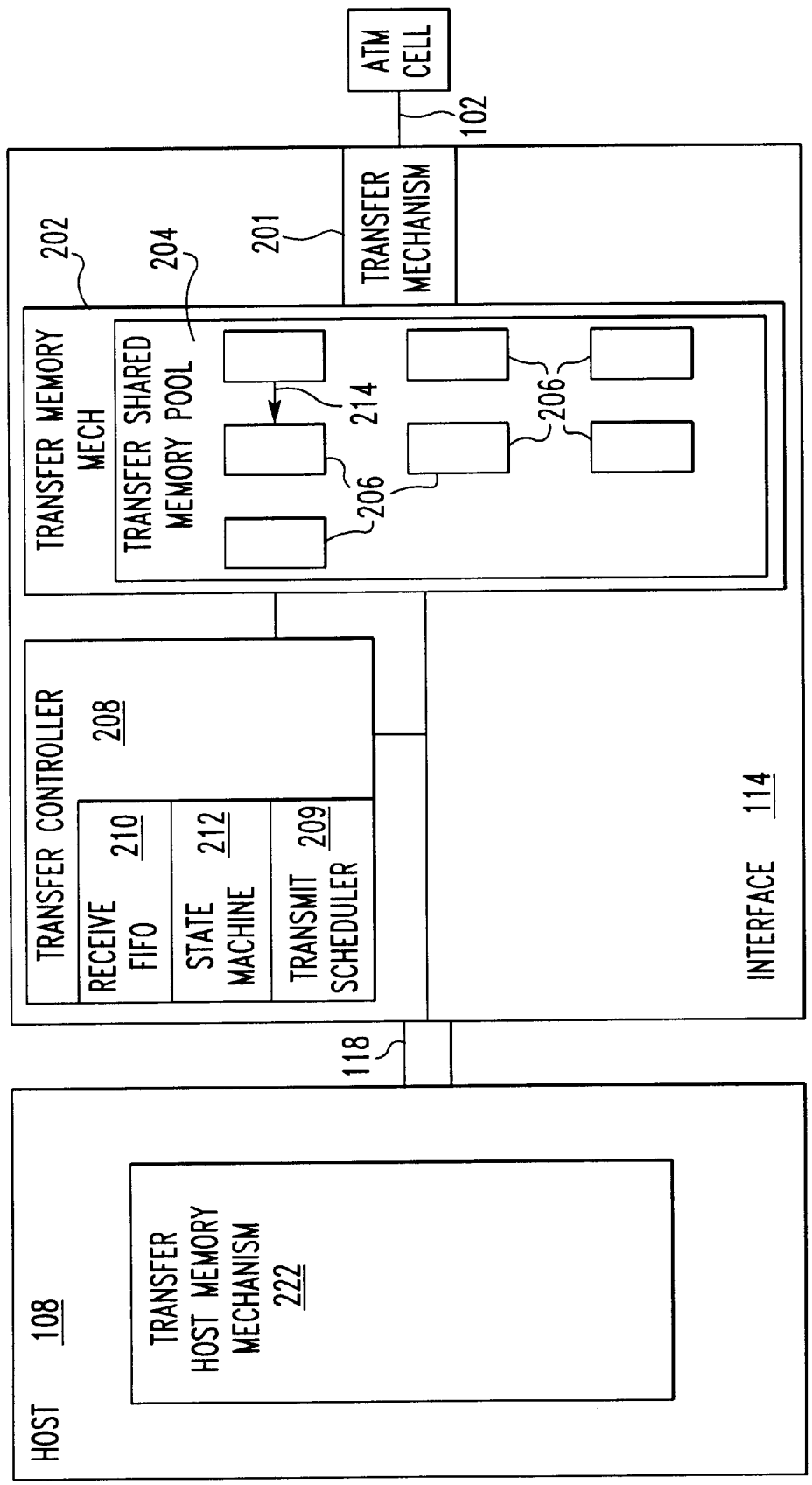
FIG. 9 is a schematic representation of a system for sequencing packets of cells for transfer to an ATM network.

Referring to FIG. 9, there is shown an ATM communications system 100. The system 100 comprises an ATM network 102 on which ATM cells of ATM packets travel. The system 100 comprises a host 108 which produces ATM packets having cells which include at least a payload. The system 100 comprises an interface 114 connected to the host 108 which sends ATM cells from the host 108 onto the ATM network 102. The interface 114 produces read requests to the host 108 for obtaining cells from the host 108. The interface 114 transfers a partial packet comprising a plurality of cells from the host 108 to the interface 114 with each read request. The interface 114 has a bus 118 which connects to the host 108 on which communication between the host 108 and the interface 114 occurs. The interface 114 has a transfer mechanism which is connected to the ATM network 102 to send cells to the ATM network 102.

Preferably, the host 108 comprises a transfer host memory mechanism 222 which stores data packets and includes a packet ready SO queue 224 that has descriptors for the data packets.

Preferably, the interface 114 has a transfer memory mechanism 202 which stores the plurality of cells until the cells are sent to the ATM network 102. The transfer memory mechanism 202 includes a transfer shared memory pool 204, such as in a transmit buffer manager 227, in which send local buffers 206 are defined to store corresponding pluralities of cells transferred from the host 108. Preferably, each send local buffer 206 stores a predetermined number of cells transferred from the host 108. Each send local buffer 206 is preferably associated with a connection which is associated with a rate.

Preferably, there is at least one send local buffer 206 in the interface 114 for every active connection the host 108 has with the ATM network 102. Active connections the host 108 has with the ATM network 102 that have a higher rate preferably have more send local buffers 206 then connections the host 108 has with the ATM network 102 that have a lower rate. Preferably, the number of send local buffers 206 for a corresponding rate increases as a function of rate. Preferably, rate is expressed as an encoded bitfield, where the encoded value typically increases as the corresponding rate increases. The bitfield is used as an address into a memory table. The memory table returns a "Target Count", which is the upper limit to the number of buffers which may be fetched. Typically, the target count increases as a function of the rate.

The interface 114 preferably forms a send local buffer 206 for a connection when there are cells in the host 108 to be stored in the interface 114. Preferably, a send local buffer 206 for a connection has a send pointer 214 to another send local buffer 206 for a connection to form a linked list of send local buffers 206 for the connection. Memory associated with a send local buffer 206 is preferably returned to the transfer shared memory pool 204 after all cells in the send local buffer 206 are sent to the ATM network 102. Preferably, each send local buffer 206 can store at least two cells.

Preferably, the host 108 produces a ready request when a corresponding packet for a connection is ready to be transferred to the interface 114. Preferably, the interface 114 has a transfer controller 208 which receives the ready request and issues a read request to the host 108 when the packet for the connection is to be transferred to the interface 114.

The transfer controller 208 preferably includes a transmit scheduler 209 that determines which connection is to be scheduled to have an associated plurality of cells transferred from the host 108 to the interface 114. Preferably, the transfer controller 208 transfers pluralities of cells associated with different connections from the host 108 to the interface 114 by multiplexing the pluralities of cells. Preferably, the transfer controller 208 includes a request FIFO 210, or a buffer request queue 234 (FIG. 12) in which read requests for corresponding pluralities of cells are queued. The request FIFO 210 is connected to the scheduler 209.

The transfer controller 208 preferably includes a state machine 212 which controls when read requests are issued to the host 108. The state machine 212 operates independent of all scheduling activities and issues read requests as a function of host 108 latencies for the transfer of cells to the interface 114. Preferably, the transfer controller 208 has a predefined target count for a maximum number of send local buffers 206 available from the transfer shared memory pool 204 for a corresponding connection. Preferably, the transfer controller 208 only allows a read request for a corresponding connection to be placed in the request FIFO 210 if a count of send local buffers 206 for the corresponding connection is less than or equal to the target count for the corresponding connection.

A predetermined portion of the request FIFO 210 is preferably dedicated for read requests for connections having a predefined priority, and when the amount of memory consumed in the request FIFO 210 is above a predetermined threshold only read requests having the predefined priority are placed into the request FIFO 210. The transfer controller 208 preferably adds a header to each cell to form it into an ATM cell after the cell has been read from the send local buffer 206.

The present invention pertains to an interface 114 for connection to a host 108 which sends ATM cells from the host 108 to an ATM network 102. The interface 114 comprises a transfer controller 208 which produces read requests to the host 108 for transferring a partial packet comprising a plurality of cells from the host 108 with each read request. The interface 114 comprises a transfer memory mechanism 202 which stores the plurality of cells transferred from the host 108 until the cells are sent to the ATM network 102. The interface 114 comprises a bus 118 which is adapted to connect to the host 108 on which the plurality of cells are transferred from the host 108 to the transfer memory mechanism 202.

Figure 10:
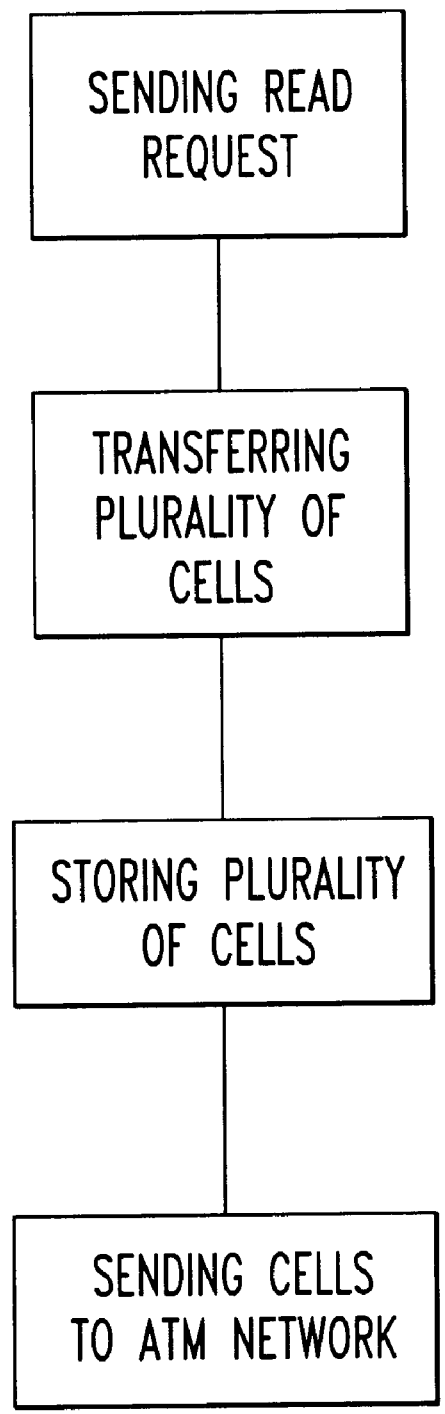
FIG. 10 is a flow chart of a method for segmenting ATM cells for transfer to an ATM network.

The present invention pertains to a method for sending ATM cells over an ATM network 102, as shown in FIG. 10. The method comprises the steps of sending a read request from an interface 114 to a host 108 for a partial packet having a plurality of cells. Then there is the step of transferring the plurality of cells from the host 108 to the interface 114. Next there is the step of storing the plurality of cells in a memory mechanism in the interface 114. Then there is the step of sending the cells from the memory mechanism interface 114 to the ATM network 102 as ATM cells.

Figure 11:
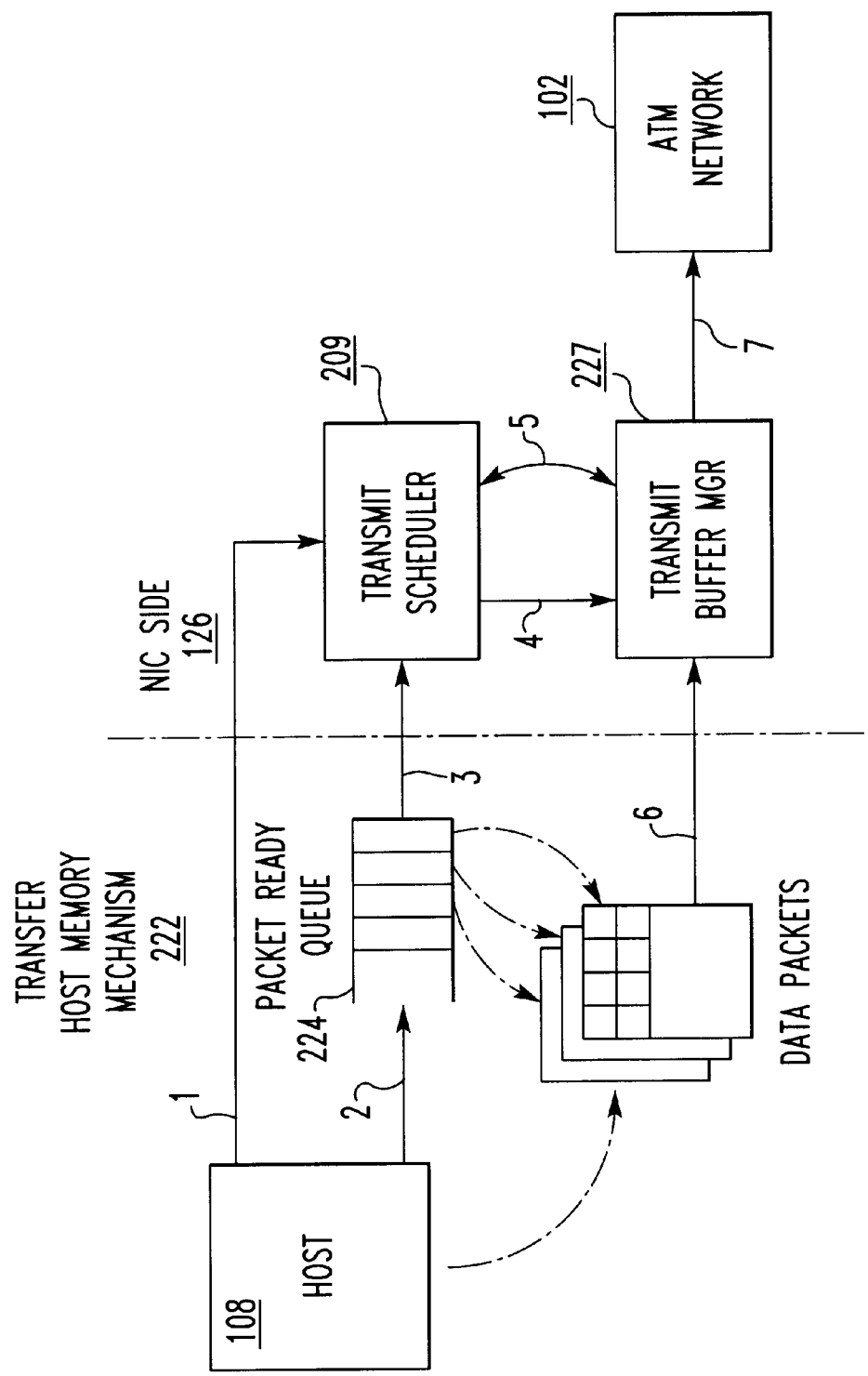
FIG. 11 is a schematic representation of a system for segmenting packets of cells for transfer to an ATM network.

In the operation of the preferred embodiment for segmenting ATM cells for sending them on the ATM network, and referring to FIG. 11, the host 108 begins transmission by first writing the desired traffic parameters for a virtual connection (VC) to the transmit scheduler 209 (Interface 1). The host 108 writes the value of the segmentation rate for the connection to the transmit scheduler 209. The host 108 then writes one or more data packets to the transfer host memory mechanism 222 and then queues one or more descriptors to the packet ready queue 224. The information enqueued on Interface 2 includes the address, length and VC for the data packet(s) in the transfer host memory.

The transmit scheduler 209 on the NIC 114 pulls the information from the packet ready queue 229 (Interface 3; same data contents as on Interface 2). If the transmit scheduler 209 determines that the VC for the data packet is not currently active, then events are generated at the segmentation rate for the VC. When an event for the VC occurs, a signal is sent to the transmit buffer manager 227 (Interface 40). The signal includes the VC of the connection, its segmentation rate and the priority of the connection (high or low).

The transmit buffer manager 227 maintains a cache of send local buffers 206 per VC. Each send local buffer 206 is a power-of-two multiple of the ATM cell payload size (48 bytes). When an event arrives on Interface 4, the transmit buffer manager 227 may read a send local buffer 206 of data from the current data packet for the VC in the transfer host memory mechanism 222. The decision of whether to fetch a local buffer 206 is based on the ACR of the VC, the number of send local buffers 206 currently cached for the VC, the priority of the VC and other factors internal to the transmit buffer manager 227. If it is determined that a send local buffer 206 will be fetched, information on the current data packet for the VC is requested from the transmit scheduler 209 on Interface 5. One or more send local buffers 206 full of data are fetched from one or more data packets from the VC in the transfer host memory mechanism 222 on Interface 6. When the transfers are complete, the state of the VC is updated back through Interface 5.

When an event is received on Interface 4 by the transmit buffer manager 227, in addition to potentially requesting a send local buffer 206 from the transfer host memory mechanism 222, the block also sends a cell from the VC to the ATM network 102 (Interface 7) if there are currently cells residing in local buffers 206 for the VC. When the transmit scheduler 209 determines that there are no more data packets for the VC in the transfer host memory mechanism 222 and there are no send local buffers 206 in the transmit buffer manager 227, events for the VC are no longer scheduled.

Figure 12:
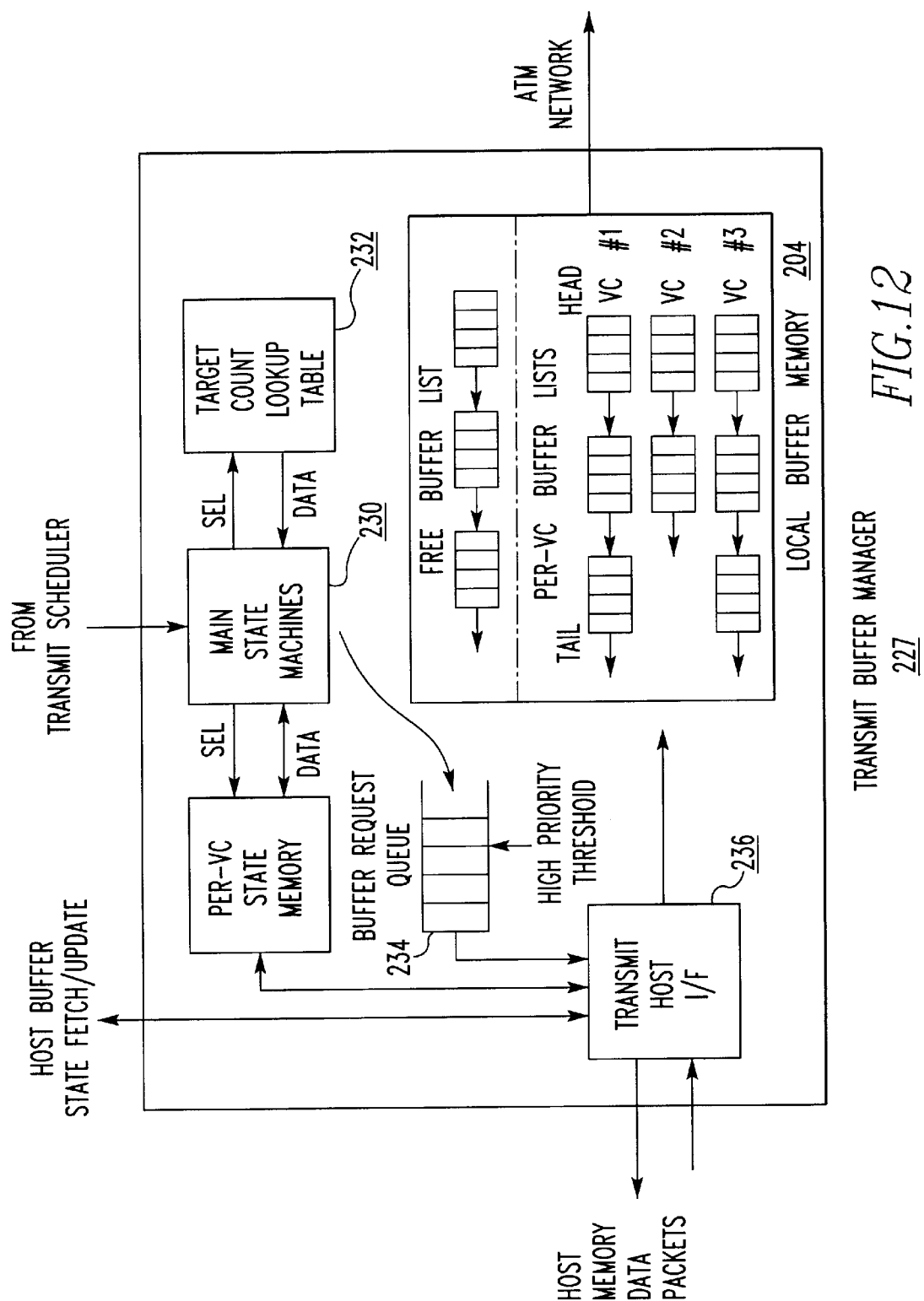
FIG. 12 is a schematic representation of a transmit buffer amateur.

FIG. 12 shows the internals of the transmit buffer manager 227.

The elements of the transmit buffer manager 227 are described below.

Main state machine 230: Consists of two threads: buffer request state machine and cell transmit state machine. The block receives VC with segmentation rate and priority from the transmit scheduler 209. The threads read a target count value from the target count lookup table 232 based on the rate of the VC. The main state machine 230 also reads and writes the per-VC state memory. For each VC, there are the:

Buffer count: The number of local buffers 206 which are currently linked to the VC.

Cell count: The index of the cell in the send local buffer head which is the next to be transmitted on the ATM network 102.

Local buffer head: First send local buffer in the list of buffers for the connection.

Local buffer tail: Last send local buffer in the list of buffers for the connection, where send local buffers are inserted.

Buffer request queue 234: Written by the main state machine 230 to request a local buffer from host memory. Read by the transmit host I/F block. Includes a high priority threshold which is set by the host 108 at system initialization or can be at adjusted dynamically during run-time.

Transmit host I/F 236: Reads requests from the buffer request queue 234 and fulfills them by requesting information on the data packets in the transfer host memory mechanism from the transmit scheduler 209. Requests send local buffers 206 from the free buffer list and links the newly filled buffer onto the appropriate per-VC buffer list.

Send local buffer memory: Consists of a collection of send local buffers, each of which is at least two cell payloads and contains a buffer size (number of cells which the buffer contains) and a next local buffer pointer (used for creating linked lists of buffers). There is a single linked-list of free buffers and a separate linked list for each VC which is active in the system. The head and tail pointer and length of each list are maintained in the per-VC state memory.

Figure 13:
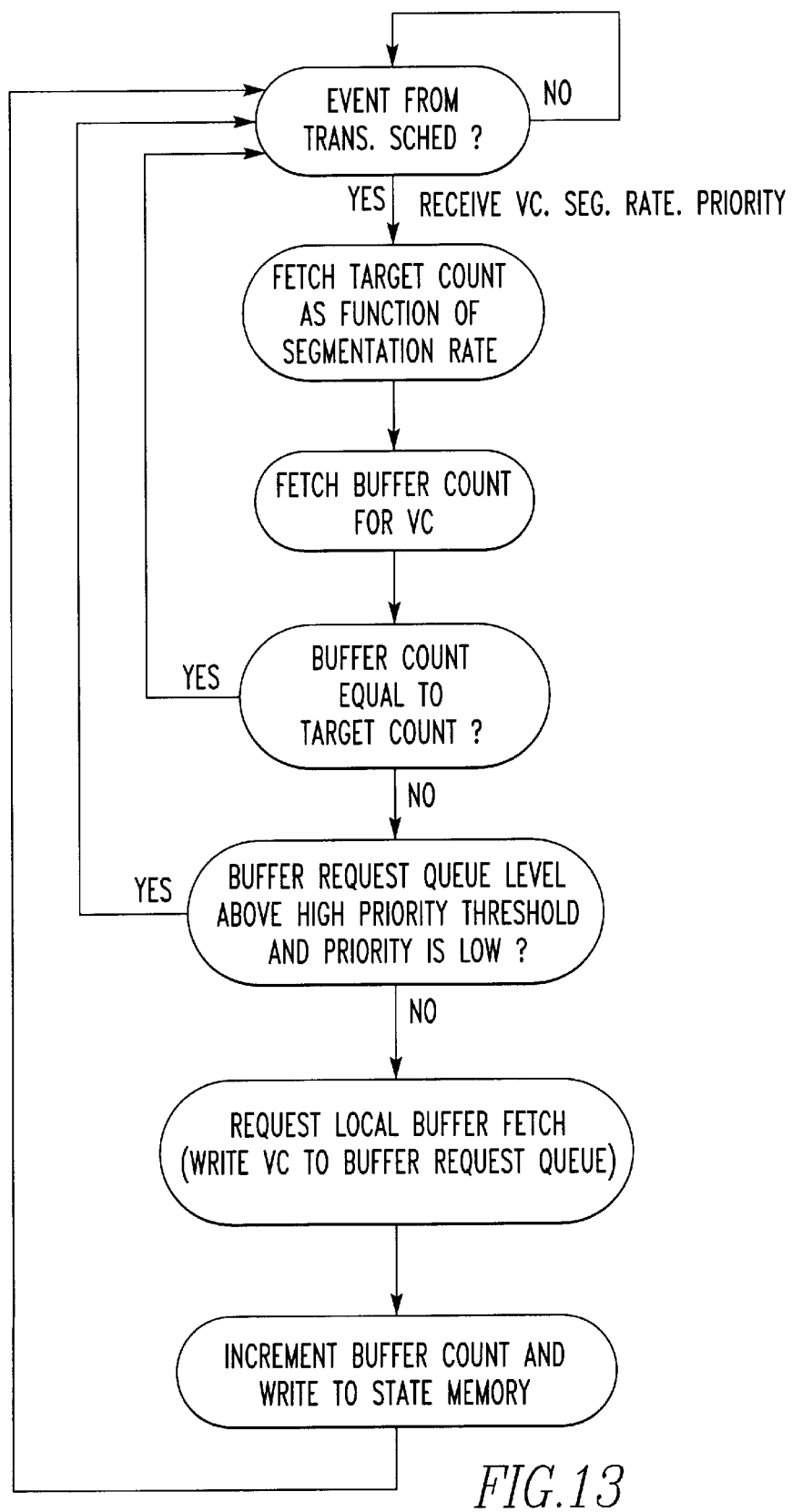
FIG. 13 is a flow chart for a buffer request state machine.

The flow chart for the buffer request state machine is shown in FIG. 13.

Figure 14:
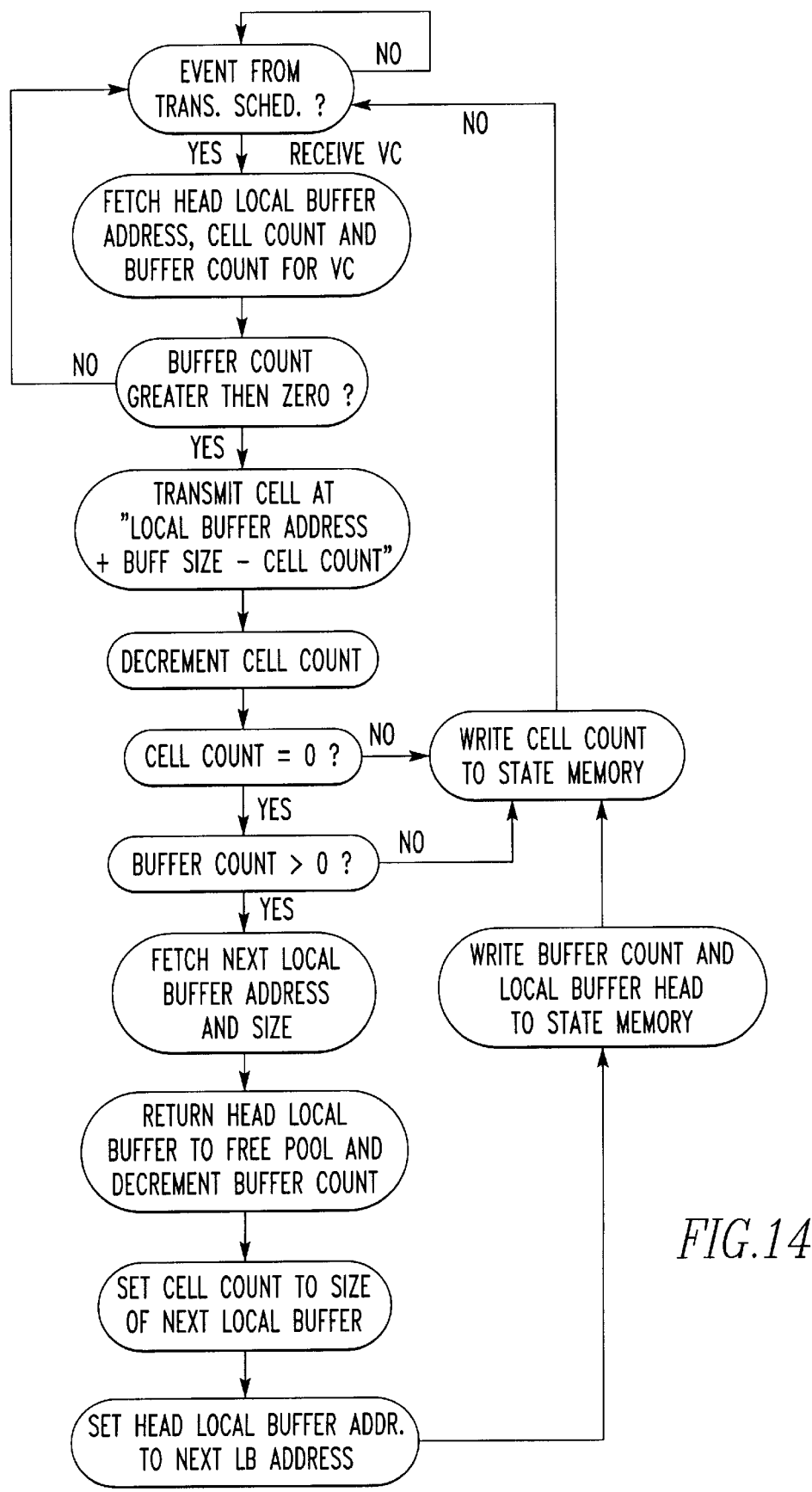
FIG. 14 is a flow charts for a cell transmit state machine.

The flow chart for the cell transmit state machine is shown in FIG. 14.

Figure 15:
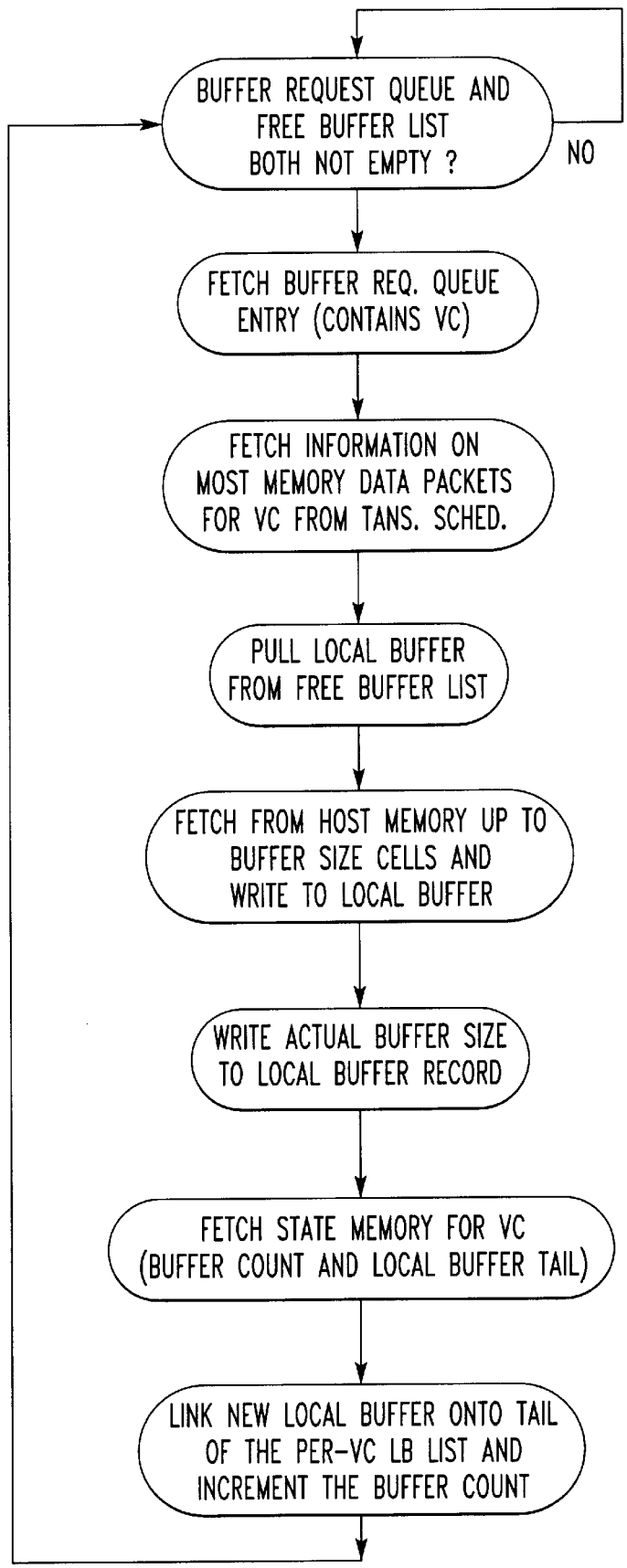
FIG. 15 is a flow chart for a transmit host interface state machine.

The flow chart for the transmit host interface state machine is shown in FIG. 15.

Where more than one cell at a time is transferred from host memory to a local buffer on the NIC and then transmitted to the ATM network from the local buffer, a problem may arise when the transmit scheduler 209 uses a combination of timers and linked lists of connections to generate events to the transmit buffer manager 227. The transmit scheduler 209 may be attempting to send cells to the ATM network 102 at a rate greater than the link can handle. Or, the host memory bus may not be able to accommodate the bandwidth required to service the connections which are active in the transmit scheduler 209. In either case, there is an imbalance in the data rate from transfer host memory mechanism 22 to NIC 126 and from NIC 126 to the ATM network 102.

Figure 17:
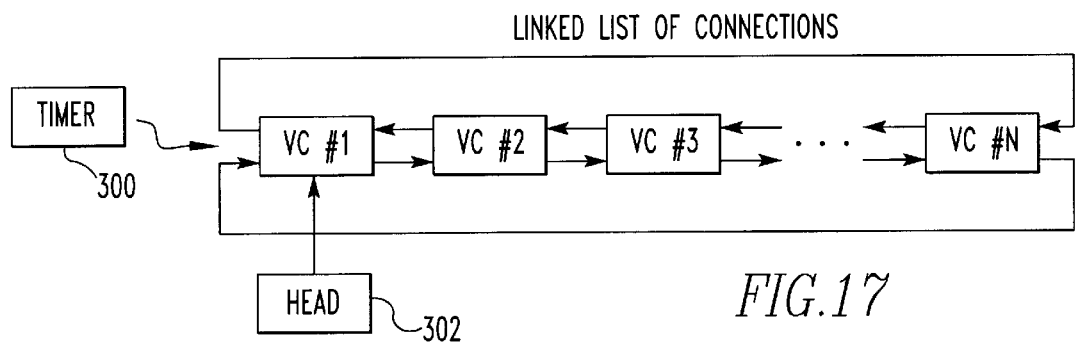
FIG. 17 is a schematic representation of a linked list of connections for a transmit scheduler.

If the transmit scheduler 209 uses a series of timers and associated linked lists of connections to scheduler traffic, there may be a large number of connections on a single linked list, as shown in FIG. 17.

In this case, the connections are all segmenting at the rate generated by timer 300. When timer 300 generates an event, the transmit scheduler 209 sends a message to the transmit buffer manager 227 for each of the VC's in the linked list, beginning at the head 302. The transmit buffer manager 227 in turn tries to fetch a send local buffer 206 for each connection and transmit a cell from each connection to the ATM network 102. When another event is generated by the timer 300, the process is repeated by sending all "N" entries again, beginning at the head 302 of the linked list.

A problem arises if the number of connections "N" is much greater than the number of entries in the buffer request queue (call this "M":) and there is a bandwidth imbalance between the host bus and the aggregate rate described by all of the connections in the linked list. In order to prevent blocking, the buffer request state machine will drop a buffer fetch request if the buffer request queue is full. In this case, only the first "M" entries or so from the linked list will be placed in the buffer request queue. As a result, only the first "M" or so entries will have data fetched from transfer host memory mechanism 222. When another event is generated by the timer 300, the process repeats again and only the first "M" or so entries will have data fetched. In some instances, it may be possible to request send local buffers 206 for all "N" entries in the linked list, but on average, the connections near the beginning of the list are able to send more data to the ATM network 102 than the connections near the end.

Figure 18:
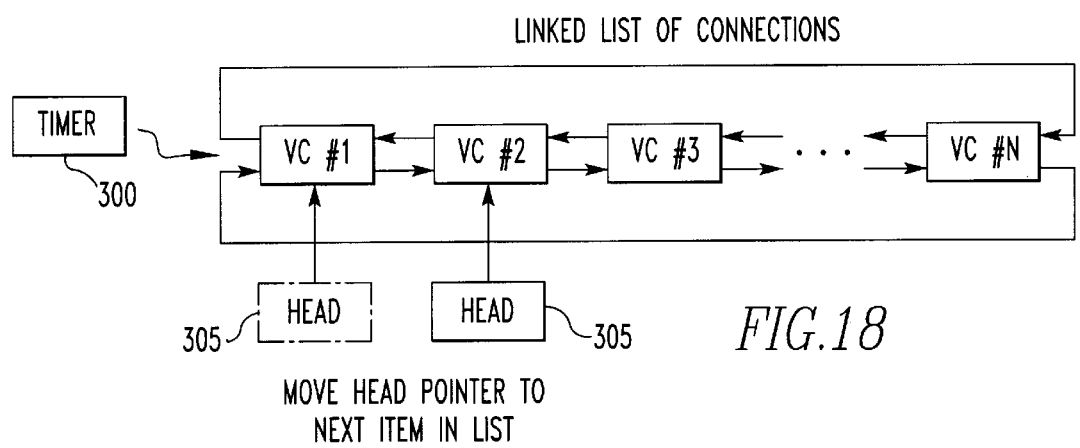
FIG. 18 is a schematic representation of a linked list of connections for a transmit scheduler with a head pointer which moves to a next item in the list.

Two possible solutions to the problem are now described. The first is the for transmit scheduler 209 to advance the head pointer 305 for the Linked List to the next entry in the list whenever the list is serviced, as shown in FIG. 18. By advancing the head pointer 305 at every service event, the probability of writing an entry to the buffer request queue is distributed evenly among the connections. This solution is most appropriate when there is no communication path from the transmit buffer manager 227 back to the transmit scheduler 209.

Figure 19:
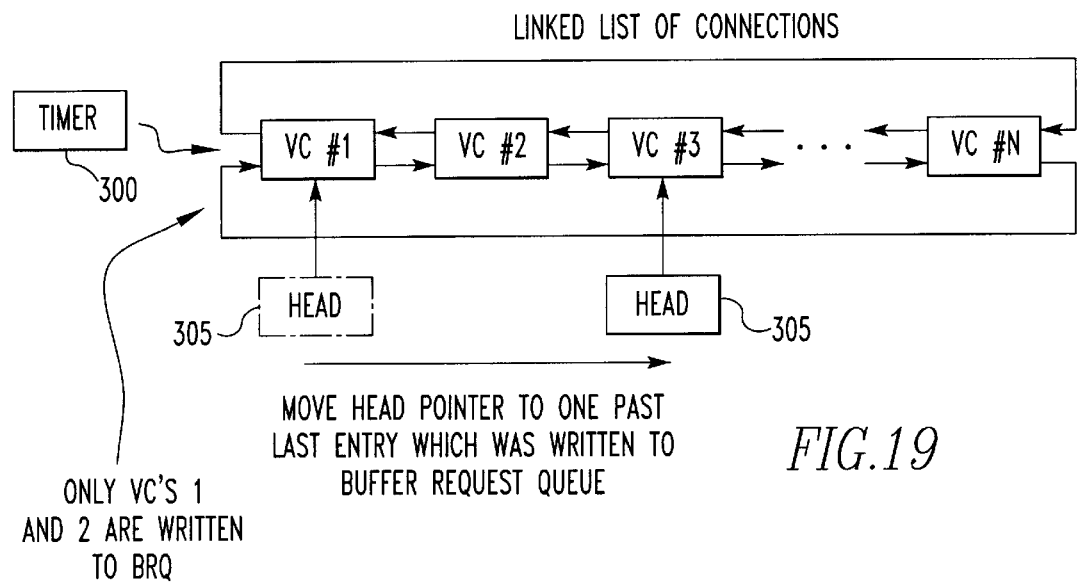
FIG. 19 is a schematic representation of a linked list of connections for a transmit scheduler with a head pointer which moves one past the last entry which was written to buffer request queue.

In the second approach, as shown in FIG. 19, the transmit buffer manager 227 informs the transmit scheduler 209 which connections was the last to be inserted into the buffer request queue. The head pointer 305 is then adjusted to point one past this last entry. This approach is fairer than the previous approach, but requires a communication path from the transmit buffer manager 227 back into the transmit scheduler 209.

Figure 16:
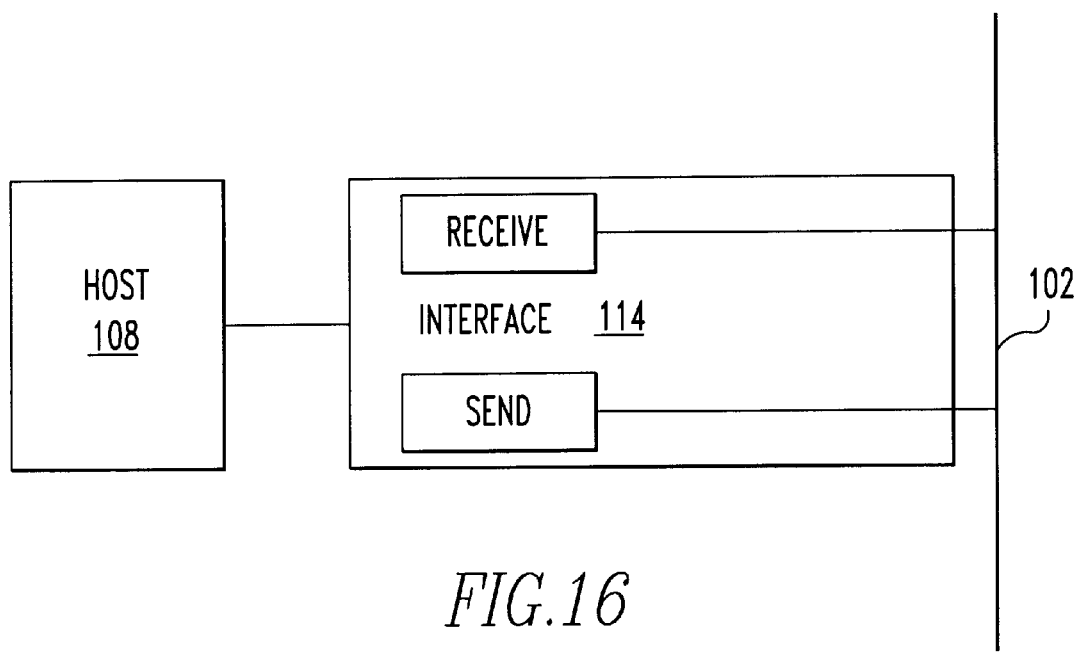
FIG. 16 is a schematic representation of a system for receiving ATM cells from an ATM network by a host and sending ATM cells to an ATM network by the host.

FIG. 16 shows the interface 114 having both the send capability and receive capability, as described above, connected to the host 108 and the ATM network 102.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An ATM communications system comprising:
an ATM network on which ATM cells of ATM packets travel;
a host having a host memory mechanism which stores the cells, the host memory mechanism has cache lines; and
an interface having a receive memory mechanism which stores a partial packet comprising a plurality of cells received from the ATM network, said receive memory mechanism aligns with the host memory mechanism, said receive memory mechanism having receive local buffers to store corresponding pluralities of cells received from the ATM network, the host memory mechanism is formed of host buffers whose alignment is defined by cache lines and whose size is independent of receive local buffers, said interface having a bus which connects to the host on which communication between the host and the interface occurs, said interface connected to the ATM network.

2. A system as described in claim 1 wherein said receive memory mechanism aligns with the host memory mechanism so every transfer from the receive memory mechanism of the plurality of cells to the host memory mechanism fills the host memory mechanism along cache lines of the host memory mechanism.

3. A system as described in claim 2 wherein the receive memory mechanism includes a receive shared memory pool mechanism in which receive local buffers are defined to store corresponding pluralities of cells received from the ATM network.

4. A system as described in claim 3 wherein each receive local buffer stores a predetermined number of cells received from the ATM network.

5. A system as described in claim 4 wherein the interface includes a complete queue to which a receive local buffer is joined when the receive local buffer is to transfer the plurality of cells stored in it to the host.

6. A system as described in claim 5 wherein the interface includes a receive controller which joins a receive local buffer to the complete queue when the receive local buffer is to transfer the plurality of cells stored in it to the host.

7. A system as described in claim 6 wherein after a receive local buffer transfers the plurality of cells into the host, the memory associated with the receive local buffer is returned to the receive shared memory pool mechanism.

8. A system as described in claim 7 wherein a receive local buffer joined to the complete queue has a pointer to a next receive local buffer in the complete queue.

9. A system is described in claim 8 wherein each cell is comprised of words and the size of each host buffer holds a predetermined number of words, and the size of each receive local buffer holds less than or equal to the predetermined number of words.

10. A system as described in claim 9 wherein the receive controller counts the words of cells received by the interface from the ATM network and places no more than the predetermined number of words from the cells received by the interface into the corresponding receive local buffer.

11. A system as described in claim 10 wherein the receive controller places any remaining words of a cell that has had words placed into a receive local buffer to fill the receive local buffer into an other receive local buffer.

12. A system as described in claim 11 wherein the receive controller joins a receive local buffer to the complete queue when the receive local buffer is filled with the predetermined number of words, the local buffer is filled with at least a last word of an end of packet cell, the connection providing the cells terminates, or the receive local buffer is filled with enough words to completely fill a host buffer.

13. A system as described in claim 12 wherein each ATM cell received from the ATM network has a header and a payload and the receive controller removes the header of a cell the interface receives and places the cell into a receive local buffer corresponding to the header of the cell.

14. A system as described in claim 13 wherein the receive shared memory mechanism includes a first receive shared memory pool and a second receive shared memory pool, each receive shared memory pool having receive local buffers, said receive controller alternatively creating receive local buffers for pluralities of cells received by the interface that they store for a corresponding connection between the first and second shared memory pools as a receive local buffer is joined to the complete queue.

15. A system as described in claim 14 wherein a word comprises four bytes.

16. A method for sending ATM cells over an ATM network comprising the steps of:

receiving a partial packet comprising a plurality of ATM cells having at least a payload of a connection at an interface from an ATM network;

storing at least the payload of the plurality of cells in a receive memory mechanism of the interface, said receive memory mechanism having receive local buffers to store corresponding pluralities of cells received from the ATM network, the host memory mechanism is formed of host buffers whose alignment is defined by cache lines and whose size is independent of receive local buffers;

sending a receive transfer signal from the interface to a host to transfer the plurality of cells from the interface to the host; and transferring the plurality of cells to host buffers of a host memory mechanism of the host, the host memory mechanism has cache lines, the host memory mechanism is formed of the host buffers whose alignment is defined by cache lines and whose size is independent of receive local buffers in conjunction with each transfer signal to the interface.

17. A method as described in claim 16 wherein the storing step includes the step of storing the plurality of cells in a receive memory mechanism of the interface which is aligned with a host memory mechanism so every transfer from the receive memory mechanism of the plurality of cells to the host memory mechanism fills the host memory mechanism along cache lines of the host memory mechanism.

18. An interface for a host having a host memory mechanism which stores the cells, said host memory mechanism having cache lines, said interface to receive ATM cells from an ATM communications network the host comprising:

a receive memory mechanism which stores a partial packet comprising a plurality of cells received from the ATM network, said receive memory mechanism adapted to align with the memory mechanism of the host, said receive memory mechanism having receive local buffers to store corresponding pluralities of cells received from the ATM network, the host memory mechanism is formed of host buffers whose alignment is defined by cache lines and whose size is independent of receive local buffers;

a bus which is connected to the receive memory mechanism and adapted to connect to the host on which communication between the host and the interface occurs;

a receive mechanism connected to the receive memory mechanism and adapted to connect to the ATM network to receive ATM cells from the ATM network; and a receive controller connected to the receive mechanism which places the ATM cells received from the ATM network into the receive memory mechanism.

19. An interface as described in claim 18 wherein said receive memory mechanism adapted to align with the memory mechanism of the host so every transfer from the receive memory mechanism of the plurality of cells to the host memory mechanism fills the host memory mechanism along cache lines of the host memory mechanism.

* * * * *